United States Patent
Baig

(10) Patent No.: US 8,133,354 B2
(45) Date of Patent: Mar. 13, 2012

(54) ACOUSTIC CEILING TILES MADE WITH PAPER PROCESSING WASTE

(75) Inventor: Mirza A. Baig, Lindenhurst, IL (US)

(73) Assignee: USG Interiors, LLC., Chicago, IL (US)

( * ) Notice: Subject to any disclaimer, the term of this patent is extended or adjusted under 35 U.S.C. 154(b) by 742 days.

(21) Appl. No.: 11/969,316

(22) Filed: Jan. 4, 2008

(65) Prior Publication Data
US 2009/0173464 A1    Jul. 9, 2009

(51) Int. Cl.
| | |
|---|---|
| *D21H 17/28* | (2006.01) |
| *D21H 17/33* | (2006.01) |
| *D21H 17/63* | (2006.01) |
| *D21H 23/04* | (2006.01) |
| *E04B 1/84* | (2006.01) |

(52) U.S. Cl. .............. 162/181.3; 162/158; 162/164.1; 162/175; 162/181.8; 162/185; 181/284; 181/294

(58) Field of Classification Search ............ 162/158, 162/164.1, 175, 181.3, 181.8, 185; 181/284, 181/294
See application file for complete search history.

(56) References Cited

U.S. PATENT DOCUMENTS

| | | | | |
|---|---|---|---|---|
| 3,494,824 A | * | 2/1970 | Roberts | 162/152 |
| 3,884,755 A | * | 5/1975 | Frost, III | 162/190 |
| 3,895,997 A | * | 7/1975 | Haywood | 162/100 |
| 5,134,179 A | * | 7/1992 | Felegi et al. | 524/13 |
| 5,241,795 A | * | 9/1993 | Giroux et al. | 52/503 |
| 5,392,721 A | * | 2/1995 | Judd | 110/344 |
| 5,478,441 A | * | 12/1995 | Hamilton | 162/189 |
| 5,496,441 A | | 3/1996 | Tran | |
| 5,536,371 A | * | 7/1996 | Verhoff | 162/189 |
| 5,562,832 A | * | 10/1996 | McOnie et al. | 210/710 |
| 5,698,305 A | * | 12/1997 | Suzuki et al. | 428/219 |
| 5,795,377 A | * | 8/1998 | Tanner et al. | 106/164.4 |
| 5,911,818 A | * | 6/1999 | Baig | 106/698 |
| 6,068,804 A | * | 5/2000 | Betzner et al. | 264/86 |
| 6,576,088 B2 | * | 6/2003 | Mannes et al. | 162/191 |
| 6,758,996 B2 | * | 7/2004 | Monovoukas et al. | 264/176.1 |
| 7,125,471 B2 | * | 10/2006 | Hill et al. | 162/189 |
| 2003/0041987 A1 | * | 3/2003 | Foster et al. | 162/145 |

FOREIGN PATENT DOCUMENTS
EP    0 697 382 A2    2/1996

OTHER PUBLICATIONS

Partial European Search Report in the corresponding application EP 08 87 0468. Sep. 27, 2011.
"Perlite", Wikipedia, http://en.wikipedia.org/wiki/Perlite. 2011.

* cited by examiner

*Primary Examiner* — Matthew Daniels
*Assistant Examiner* — Dennis Cordray
(74) *Attorney, Agent, or Firm* — Pradip Sahu; David F. Janci; Philip T. Petti

(57) ABSTRACT

A composition and process suitable for making acoustic tiles are disclosed. Certain embodiments of the composition comprise: perlite; inorganic material selected from the group consisting of calcium sulfate, calcium carbonate, clay and mixtures thereof; a binder selected from the group consisting of starch, a combination of starch and cellulosic fibers, latex, kraft paper gel and mixtures thereof; optionally mineral wool; optionally gypsum; and cellulosic fiber, wherein at least a portion of the cellulosic fiber and at least a portion of the inorganic material are pulp and paper processing waste comprising cellulosic fiber, clay and calcium carbonate. Certain embodiments of the process comprise: forming an aqueous slurry; continuously flowing slurry onto a moving foraminous wire to form a cake; dewatering the cake to form a base mat; and drying the base mat.

20 Claims, No Drawings

ACOUSTIC CEILING TILES MADE WITH PAPER PROCESSING WASTE

BACKGROUND

1. Technical Field

Compositions comprising paper processing waste as a source of cellulosic fiber and inorganic material are disclosed which are useful in manufacturing acoustic ceiling tiles and acoustic panels using a water felting process. More particularly, acoustic tile compositions using paper processing waste as a primary source of cellulosic fiber and a primary source of inorganic material are discussed which provide faster drainage times thereby reducing raw material costs and increasing line speed.

2. Description of the Related Art

The water felting of dilute aqueous dispersions of mineral wool and lightweight aggregate is a well-known commercial process for manufacturing acoustic ceiling tiles. In this process, an aqueous slurry of component materials such as mineral wool, perlite, binder (such as starch, latex, or others known in the art), inorganic material and cellulosic fiber is deposited onto a moving foraminous support wire, such as a Fourdrinier or Oliver mat forming machine, for dewatering or drainage. The slurry may be first drained by gravity followed by vacuum suction to form a base mat. The wet base mat is then pressed to the desired thickness between rolls and the support wire to remove additional water. The pressed base mat is then dried in ovens before the dried material is cut to the desired dimensions. The surfaces of the cut material can be sanded and top and/or bottom coated to produce acoustic ceiling tiles and panels.

Mineral wool acoustic tiles are very porous which results in good sound absorption. Starch is typically used as a binder in mineral wool-based ceiling tiles. Mineral materials, such as high density expanded perlite, are also used to enhance sound absorbing properties and to provide strength to the otherwise lightweight tiles and panels. While the use of expanded perlite can require a high level of water to form a workable slurry, the use of high density perlite can alleviate this problem.

Inorganic materials, such as clay are used in ceiling tiles to impart fire resistance (as defined by ASTM Test No. E119) because the clay sinters during the fire endurance test. Various commercial clays such as kaolin, and bentonite, etc. can be used in ceiling tile fabrication. Gypsum is an excellent inorganic material because it also acts as a flocculent. Calcium carbonate is another useful inorganic material because it is inexpensive and can add hardness to the finished product. One problem associated with inorganic materials is their tendency to settle to the bottom of the base mat during tile formation (due to high specific gravity) which increases drainage time and reduces line speed and therefore increases manufacturing costs.

Typically, the cellulosic fiber for ceiling tiles is obtained from either hydropulped or hammer milled newsprint that is being recycled. Recycled fibers from old newsprint have a substantial cost associated with their use as the long fibers recaptured from old newsprint can be processed into finished paper products. Refined paper and wood fibers may also be used for ceiling tile fibers. One problem with all of these fiber sources for ceiling tile is cost. The cost of manufacturing ceiling tiles could be reduced if a fiber source and perhaps an inorganic material source could be found amongst various existing waste streams which would enable ceiling tile manufacturers to obtain fiber and inorganic material sources for free or at a very low cost.

Each year, the 112 kraft-process paper mills across the United States produce approximately 1.5 million tons of waste material from their energy and chemical recovery processes. This waste material known as "paper sludge" is a clay-like material consisting of clays, calcium carbonate, short fibers (i.e., too short for use in making paper products), other inorganic materials and water. Another source of paper sludge is paper recycling processes where waste paper is received and de-inked prior to recovery of the longer fibers. During the de-inking process fiber sludge is generated, which contains particles of ink, materials such as clays and calcium carbonate, water and fibers too short to be converted to a recycled finished paper product.

In the past, paper sludge has typically been sent to landfills. With landfill costs rising and the potential for ground water contamination from landfill operations, many environmentally conscious paper producers are trying to recover the energy from paper sludge.

However, the paper sludge includes at least two components used in the manufacture of acoustic ceiling tiles: cellulosic fibers and inorganic materials (clay, calcium carbonate, etc.) It would be beneficial if paper sludge could be converted to a feedstock for acoustic ceiling tile manufacturing as it would avoid the cost and environmental impact of landfill disposal of paper sludge. More importantly for ceiling tile manufacturers, the use of paper sludge as a raw material in ceiling tile formation could replace at least two costly raw materials—cellulosic fibers from hydropulped paper processing and inorganic material—with one inexpensive and readily available material in the form of paper sludge.

SUMMARY OF THE DISCLOSURE

An acoustic panel that can be used as an acoustic ceiling tile, or other type of acoustic panel is disclosed which comprises cellulosic fibers and inorganic materials obtained substantially from paper sludge. Instead of depositing paper sludge in landfills, the paper sludge is used as a raw material for the disclosed acoustic tiles and panels.

In an embodiment, a disclosed acoustic panel comprises, on a dry basis, more than 0 to about 75 wt % mineral wool; more than 0 to about 30 wt % inorganic material selected from the group consisting of calcium sulfate, calcium carbonate, clay and mixtures thereof; more than 0 to about 15 wt % binder selected from the group consisting of starch, latex, a combination of starch and cellulosic fibers, kraft paper gel, and mixtures thereof; from about 25 to about 70 wt % perlite; and from about 10 to about 40 wt % cellulosic fiber. In such an embodiment, at least a portion of the cellulosic fiber and at least a portion of the inorganic material are obtained from pulp and paper processing waste, also known as "paper sludge". The paper sludge comprises cellulosic fiber and inorganic materials selected from the group consisting of calcium clay, carbonate and mixtures thereof.

Waste material from either a virgin paper processing plant or a paper recycling plant is used as a raw material in the manufacture of acoustic tiles and panels.

In an embodiment, all of the cellulosic fiber content of the finished acoustic panel is obtained from paper sludge. In other embodiments, substantial portions of cellulosic fiber content is obtained from paper sludge with the remaining cellulosic fiber content obtained from hydropulped or hammer milled paper sources.

In a refinement, mineral wool is present in an amount less than or equal to about 10 wt %.

In another refinement, gypsum is present in an amount less than or equal to 20 wt %.

In another refinement, starch is present in an amount ranging from about 5 to about 15 wt %.

In another refinement, the perlite is expanded perlite and is present in an amount ranging from about 40 to about 65 wt %. The density of the expanded perlite can vary greatly and can range from about 3 to about 20 pounds per cubic foot (pcf). The use of high density expanded perlite is not necessary, but it can be beneficial.

In an embodiment, a disclosed acoustic panel comprises, on a dry basis, more than 0 to about 75 wt % mineral wool; more than 0 to about 30 wt % gypsum; more than 0 to about 15 wt % binder, preferably starch; from about 25 to about 70 wt % perlite; and more than 0 to about 40 wt % paper sludge comprising cellulosic fiber and inorganic materials that may include various combinations of clay and calcium carbonate. Part of the cellulosic fiber content can be derived from a hydropulped paper source.

One preferred acoustic tile composition on a dry basis, comprises mineral wool in an amount ranging from more than 0 to about 10 wt %, gypsum in an amount ranging from more than 0 to about 20 wt %, paper sludge in an amount ranging from more than 0 to about 40 wt %, starch or other suitable binder in amount ranging from about 5 to about 15 wt %, and perlite in an amount ranging from about 40 to about 65 wt %.

When mineral wool is utilized, a portion of the binder may comprise latex or a latex binder.

A process for manufacturing acoustic panels using a water-felting process is disclosed. The disclosed method comprises forming an aqueous slurry comprising extended perlite, optionally, mineral wool, inorganic material selected from the group consisting of calcium sulfate, calcium carbonate, clay and mixtures thereof, cellulosic fibers and binder selected from the group consisting of starch, a combination of starch and cellulosic fibers, latex, kraft paper gel and mixtures thereof, wherein at least a portion of the cellulosic fiber and at least a portion of the inorganic material obtained from paper sludge comprising cellulosic fiber and inorganic material including one or more of clay and calcium carbonate and mixtures thereof. The method further includes continuously flowing the slurry on to a moving foraminous support wire to form a cake, dewatering the cake to form a wet-mat or a base mat and drying the base mat to produce acoustic tile.

Other advantages and features will be apparent from the following detailed description.

DETAILED DESCRIPTION OF THE PRESENTLY PREFERRED EMBODIMENTS

Acoustic tile compositions are disclosed wherein the cellulosic fiber content and the inorganic solids content are at least partially obtained by using paper sludge as a raw material. The paper sludge may be obtained from either a virgin paper processing operation or a paper recycling process. In either case, the waste "paper sludge" contains cellulosic fibers with inorganic materials such as clay, calcium carbonate or a combination thereof. The disclosed compositions containing paper sludge may be used in a water felting process to form tiles as the disclosed compositions have superior drainage qualities.

An aqueous slurry of the composition is flowed onto a moving foraminous support wire where it forms a cake which is dewatered, first by gravity and then by vacuum. The dewatered cake is then pressed to a selected thickness to form a base mat. The pressing step further dewaters the base mat. The base mat is then passed in to a drying kiln in which the moisture in the base mat is reduced to less than 5% and preferably less than 1%.

The acoustic tile/panel compositions disclosed herein in many cases include relatively high-density expanded perlite; cellulosic fibers; inorganic material selected from the group consisting of calcium sulfate, calcium carbonate, clay and mixtures thereof; a binder selected from the group consisting of starch, latex, cellulosic fibers mixed with starch, kraft paper gel and mixtures thereof; and optionally, mineral fiber and other conventional additives. In the preferred embodiment, the cellulosic fibers and inorganic materials are provided at least in part by using paper sludge as a raw material. Again, the paper sludge may be a waste product of either a virgin paper process or a paper recycling process.

One preferred composition includes relatively high density, expanded perlite, paper sludge, starch and optionally mineral fiber and optionally gypsum. This disclosure is not limited to any precise amounts of materials. Exemplary compositions are expressed below in percentages by weight (wt %) on a dry basis of the individual components. Those skilled in the art will recognize that the maximum benefits of this disclosure are achieved by compositions that include the use of paper sludge as either a sole source or the primary source of cellulosic fibers and as a primary source of inorganic materials due to its cost benefit, provided the required physical properties of the product are maintained. Of course, acoustic panel compositions using conventional (hydropulp) fibers and inorganic materials in addition to paper sludge fall within the scope of this disclosure.

Cellulosic Fibers

The cellulosic fibers may be obtained from rejected waste material or "paper sludge" from virgin paper processing plants as well as paper recycling plants. The rejected sludge typically includes short fibers (i.e., too short to be used in paper products), clay and calcium carbonate. The ratio of cellulosic fiber to inorganic material in the sludge can range from about 90:10 to about 40:60 and can vary daily from a given plant. Therefore, the makeup of the sludge feed should be monitored. It has been surprisingly found that the intimate coating of the fibers by the inorganic components of the paper sludge enhances the ability of the formed base mat to drain, thereby reducing drain times enabling faster line speeds. Further, using rejected paper sludge as a feedstock for ceiling tile manufacturing eliminates the costs associated with landfill disposal of the sludge ($25-30/ton) and provides a low-cost alternative to using hydropulp cellulosic fibers which have an associated cost with their use.

Depending upon the fiber:inorganic solids ratio of the sludge, paper sludge may be present in an amount ranging from more than 0 to about 40 wt % on a dry basis. Preferably, the cellulosic fiber content in a finished product ranges from about 15 to about 25 wt %, more preferably about 18 to about 24 wt %. All or part of this fiber content can be provided by paper sludge. If only part of the fiber content is provided by paper sludge, the remainder can be provided by conventional hydropulped cellulosic fiber, which is shown below to not provide any significant advantages over paper sludge fiber.

Inorganic Materials

Clay is a good inorganic material in order to impart fire resistance (as defined by ASTM Test No E119) because the clay sinters during the fire endurance test. In the examples which follow, the clay is a known solid component of the paper sludge that is used as a raw material for both inorganic solids and cellulosic fiber. Hence, additional clay may not be necessary. Using paper sludge as a feedstock may eliminate or limit the need for additional clay to some extent.

If additional clay is needed due to variations in the composition of the paper sludge, ball clay or spinks clay from the Kentucky-Tennessee (KT) Clay Company of Gleason, Tenn., CTS-1 and/or CTS-2 from KT Clay of Sledge, Miss., or clay supplied by Old Hickory Clay from Hickory, Ky. can be used. Other commercial clays include kaolin, bentonite and others known to those skilled in the art of ceiling tile fabrication.

Calcium carbonate is a typical material that has no significant value in the board properties except that it may give some hardness to the product but it can lower the cost of the product. Because calcium carbonate ($CaCO_3$) is a known component of paper sludge, additional calcium carbonate should not be necessary, but may be used.

Other commonly used low cost inorganic materials are gypsum of any form (calcium sulfate dihydrite; $CaSO_4.2H_2O$ (which can be in the form of re-hydrated hemihydrate, for example); calcium sulfate hemihydrate—$CaSO_4.\frac{1}{2}H_2O$; or calcium sulfate anhydrite—$CaSO_4$) and fly ash. Gypsum may be employed as an inorganic material in certain embodiments. Gypsum has limited solubility in water, and it also acts as a flocculent. By functioning as a flocculent in the slurry, the gypsum helps to retain and uniformly distribute the fine particles (inorganic clay, organic starch, short cellulosic fibers, etc.) in the mat during the processing (dewatering, vacuum and wet pressing). Gypsum or other flocculants promote the drainage because of migration of fine and high density particles to the bottom of the mat during the processing. Gypsum can be used to produce a mat thickness higher than that produced by other inorganic materials such as clays and calcium carbonate. A higher mat thickness (or "loft") prior to wet pressing is beneficial in removing excess water. The use of gypsum can obviate the need for another flocculent, a coagulant and/or a surfactant. Gypsum can also be used to improve the hardness in the board. Gypsum can act as a dispersant to de-agglomerate mineral fiber and/or cellulose fiber and thereby facilitate slurry consistency which can lead increased line speeds. Gypsum also does not significantly "spring-back" or swell after pressing and drying of the core mat so that the need to sand the core to control core thickness is reduced.

As shown below, gypsum can be used as a supplemental inorganic material when the inorganic solids component of the paper sludge is insufficient. Gypsum can also be used to increase the density of the finished tiles or panels. Gypsum may be present from more than 0 to about 30 wt %, more preferably from more than 0 to about 20 wt %.

Binder

The binder may be selected from the group consisting of starch, latex, cellulose fibers mixed with starch, kraft paper gel and mixtures thereof. Starch is one preferred binder and may or may not be cooked prior to use. A starch gel may be prepared by dispersing starch particles in water and heating the slurry until the starch is fully or partially cooked and the slurry thickens to a viscous gel. However, if conventional hydropulp fibers are used as a supplemental source of fiber, they may be incorporated into the starch slurry prior to cooking. The cooking temperature of the starch slurry should be closely monitored to assure full swelling of the starch granules. The cooking temperature for cornstarch can range from about 180° F. (82° C.) to about 195° F. (90° C.). Starch may also be used as a binder without pre-cooking the starch, because it forms a gel during the process of drying the base mat.

A latex binder may be used in place of the starch or cellulose fiber or the latex may be used in combination with the starch and/or cellulose fiber binder. The latex binder may have a glass transition temperature ranging from about 86° F. (30° C.) to about 230° F. (110° C.). Examples of latex binders include polyvinyl acetate, vinyl acetate/acrylic emulsion, vinylidene chloride, polyvinyl chloride, styrene/acrylic copolymer and carboxylated styrene/butadiene polymers.

Increased binder content, preferably in the form of starch, can be used to increase strength (MOR—modulus of rupture (psi)) and enhance the cutability of the finished tiles/panels. The binder can be present from more than 0 to about 15 wt %, more preferably from about 5 to about 15 wt %.

Aggregate—Perlite

One ingredient of the disclosed acoustic tile compositions is a lightweight aggregate material, preferably expanded perlite. Expanded perlite is preferred for its low cost and performance. The expanded perlite provides porosity and "loft" in the final product, which enhances acoustic properties.

Perlite is a form of glassy rock, similar to obsidian with the capacity to expand greatly on heating. Perlite generally contains 65-75 wt % $SiO_2$, 10-20 wt % $Al_2O_3$, 2-5 wt % $H_2O$, and smaller amounts of soda, potash, and lime. Expanded perlite denotes any glass rock and more particularly a volcanic glass that has been expanded suddenly or "popped" while being heated rapidly. This "popping" generally occurs when the grains of crushed perlite are heated to the temperatures of incipient fusion. The water contained in the particles is converted into steam and the crushed particles expand to form light, fluffy, cellular particles. Volume increases of the particles of at least ten fold are common. Expanded perlite is generally characterized by a system of concentric, spheroidal cracks, which are called perlite structure. Different types of perlite are characterized by variations in the composition of the glass affecting properties such as softening point, type and degree of expansion, size of the bubbles and wall thickness between them, and porosity of the product.

In the conventional process of preparing expanded perlite, the perlite ore is first ground to a fine size. The perlite is expanded by introducing the finely ground perlite ore into the heated air of a perlite expander. Typically the expander heats the air to about 1750° F. The finely ground perlite is carried by the heated air which heats the perlite and causes it to pop like popcorn to form the expanded perlite having a density of about 3 to 5 pounds per cubic foot. When expanded perlite is placed in contact with water, the water penetrates the cracks and fissures and enters into the air filled cavities of the perlite, thereby causing the perlite to retain large amounts of water within the expanded perlite particles.

Using the relatively high density perlite, i.e. a perlite which has been expanded to a density of over 7 or 8 pounds per cubic foot (versus the normal range of 3 to 5 pounds per cubic foot), lowers the water needed to form a suitable slurry. See, U.S. Pat. No. 5,911,818. The aqueous slurry with less water requires less dewatering, and produces a base mat having less water retained by the perlite. The resulting product has improved compressive resistance and maintained fire ratings, as defined by ASTM Test No. E119. The base mat having a lower water content can be dried faster which allows the entire water felting line to be run at higher speed.

High density perlite is also beneficial when manufacturing fire rated ceiling tiles which must meet a minimum density. However, when the density of the expanded perlite exceeds about 20 pounds per cubic foot, the perlite does not produce as much "loft" or bulk in the final product. As a result, the density of the final product may be too high to maintain the low thermal conductivity required to pass the ASTM E119 fire endurance test.

The disclosed ceiling tile compositions may contain from more than 0 to about 70 wt % perlite of either the high or low density type, more preferably from about 25 to about 70 wt %, most preferably from about 40 to about 65 wt %. The size of the expanded perlite particles is not critical and it is not deemed to be necessary to use a particularly small perlite particle size. Equivalents of the expanded perlite such as vermiculite, glass beads, diatomite or exfoliated clays may also be used as substitutes for the perlite or in combination therewith.

Mineral Wool

The disclosed acoustic tile/panel compositions may also contain mineral wool of the type conventionally used in acoustic tiles. Mineral wool in a ceiling tile increases the sound absorption (NRC) of the tile. In general, the higher the amount of mineral wool the better the sound absorption. Mineral wool also advantageously gives bulking to the slurry during formation of the core.

The mineral wool may be any of the conventional mineral fibers prepared by attenuating a molten stream of basalt, slag, granite or other vitreous mineral constituent. The molten mineral is either drawn linearly through orifices, commonly referred to as textile fiber, or it is recovered tangentially off the face of a spinning cup or rotor, commonly referred to as wool fiber. The mineral wool constituent is suitably present in an amount ranging from 0 to about 75 wt %, more preferably about 10 wt %.

The following specific examples will further illustrate various specific embodiments using paper sludge as a source of cellulosic fiber and inorganic material. Again, unless specified to the contrary, all amounts are expressed as parts by weight on a dry solids total weight basis. Of course, it is to be understood that these examples are by way of illustration only and are not to be construed as limitations on this disclosure.

EXAMPLES

Paper sludge from a virgin paper processing plant was utilized in the following examples. The sludge consisted of waste streams from both the pulp mill and paper mill processing areas of the plant. The pulp mill sludge also included some woodchips of about ¼ inch in size. The wood chips can be easily removed using a conventional screen after the sludge is diluted to form a slurry. To form the sludge, separate waste streams pass through separate clarifiers and the suspended solids are mixed and wet-pressed so that they may be transported as sludge cakes to a land fill. In this case, the land cakes were retrieved and used in the following acoustic ceiling tile and panel formulations. The pressed sludge cakes included approximately 45 wt % solids, and the typical ratio of cellulosic fiber to inorganic material was 65:35 although the ratio ranged from 88:12 to 43:57.

Prior to using the sludge cake, sludge is screened to remove woodchips and processed in the mixing tank to obtain certain consistency. Instead of screening the woodchips, the material can be pulverized. The density of the expanded perlite used below is approximately 6.0 pcf. All wt % values are on a dry basis.

Example 1

| | Control Panel No. 1 | Test Panel No. 1 | Test Panel No. 2 | Test Panel No. 3 | Test Panel No. 4 |
|---|---|---|---|---|---|
| Components | | | | | |
| Mineral Wool | 8.0 | 8.0 | 8.0 | 8.0 | 8.0 |
| Perlite | 55.0 | 55.0 | 55.0 | 55.0 | 55.0 |
| Starch | 8.0 | 8.0 | 8.0 | 8.0 | 8.0 |
| Fiber (hydropulp) | 19.0 | 0 | 4.75 | 9.5 | 14.25 |
| Fiber (sludge) | 0 | 19.0 | 14.25 | 9.5 | 4.75 |
| Total Fiber | 19.0 | 19.0 | 19.0 | 19.0 | 19.0 |
| Gypsum | 10.0 | 2.0 | 4.0 | 6.0 | 8.0 |
| Sludge Inorganic | 0.0 | 8.0 | 6.0 | 4.0 | 2.0 |
| Total Inorganic | 10.0 | 10.0 | 10.0 | 10.0 | 10.0 |
| Total | 100.0 | 100.0 | 100.0 | 100.0 | 100.0 |
| Properties | | | | | |
| Caliper (in) | 0.481 | 0.494 | 0.504 | 0.504 | 0.478 |
| Density (pcf) | 13.8 | 15.0 | 15.6 | 12.7 | 13.8 |
| MOR (psi) | 150 | 126 | 156 | 89 | 139 |
| Corrected MOR (psi) 13.7 pcf | 149 | 106 | 121 | 104 | 138 |
| Drain Time (Sec) | 8.0 | 5.0 | 6.0 | 6.5 | 7.0 |

The Corrected MOR (psi) for all testing is calculated according to the following formula: Corrected MOR (psi)= (Corrected Density)$_2$×(Actual MOR psi)/(Actual Density)$^2$. In this initial study, panels were made using an 8.0 wt % mineral wool formulation with a standard 19.0 wt % cellulosic fiber content. The control included 19.0 wt % conventional hydropulp cellulosic fiber. Experimental boards 1-4 included 0 wt % hydropulp fiber (Test Panel no. 1) 25 wt % hydropulp paper (Test Panel no. 2) 50 wt % hydropulp fiber (Test Panel no. 3) and 75 wt % hydropulp fiber (Test Panel no. 4). Gypsum was used to supplement the inorganic material from the paper sludge as the paper sludge content was decreased. Total inorganic material content was maintained at 10.0 wt % for control panel land test panels 1-4.

The strength of test panels 1-4, with perhaps the exception of test panel 3, was acceptable as a MOR of greater than 100 psi is considered to be adequate. Test panel no. 3 still has a corrected MOR of 106. All of the MOR values were normalized to a density of 13.7 pcf.

A significant advantage seen in test panel 1, with 100% of the fiber and inorganics coming from paper sludge, was the superior drain time of 5.0 seconds. The superior drain time enables faster line speeds thereby further driving down manufacturing costs. Test panel no. 1 also includes no hydropulped cellulosic fiber and only a minimum amount of added gypsum at 2.0 wt % to maintain the total inorganic value of 10.0 wt %.

Example 2

| | Control Panel No. 1 | Test Panel No. 5 |
|---|---|---|
| Components | | |
| Mineral Wool | 0 | 0 |
| Perlite | 52.0 | 52.0 |
| Starch | 6.0 | 6.0 |

-continued

|  | Control Panel No. 1 | Test Panel No. 5 |
|---|---|---|
| Fiber (hydropulp) | 18.0 | 0.0 |
| Fiber (sludge) | 0.0 | 18.0 |
| Total Fiber | 18.0 | 18.0 |
| Gypsum | 24.0 | 16.0 |
| Sludge Inorganic | 0.0 | 8.0 |
| Total Inorganic | 24.0 | 24.0 |
| Total Properties | 100.0 | 100.0 |
| Caliper (in) | 0.601 | 0.581 |
| Density (pcf) | 10.6 | 10.9 |
| MOR (psi) | 81 | 69 |
| Corrected MOR (psi)@12 pcf | 103 | 84 |
| Drain Time (Sec) | 7.75 | 3.25 |

The objective of example 2 was to test mineral wool-free formulations. As seen above, the MOR of test panel no. 5 remained 20% less than the control panel 2 but it is anticipated that increasing the starch level could overcome the lower than expected MOR. A key advantage of test panel no. 5 was the superior drain time of 3.25 seconds, which was less than half the drain time of control panel 2.

Example 3

|  | Control Panel No. 3 | Test Panel No. 6 | Test Panel No. 7 | Test Panel No. 8 | Test Panel No. 9 |
|---|---|---|---|---|---|
| Components |  |  |  |  |  |
| Mineral Wool | 0 | 0 | 0 | 0 | 0 |
| Perlite | 52.0 | 52.0 | 52.0 | 52.0 | 52.0 |
| Starch | 6.0 | 6.0 | 6.0 | 6.0 | 6.0 |
| Fiber (hydropulp) | 18.0 | 0.0 | 0.0 | 0.0 | 0.0 |
| Fiber (sludge) | 0.0 | 18.0 | 20.0 | 22.0 | 24.0 |
| Total Fiber | 18.0 | 18.0 | 20.0 | 200 | 24.0 |
| Gypsum | 24.0 | 16.0 | 13.4 | 10.6 | 7.7 |
| Sludge Inorganic | 0.0 | 8.0 | 8.6 | 9.4 | 10.3 |
| Total Inorganic | 24.0 | 24.0 | 22.0 | 20.0 | 18.0 |
| Total Properties | 100.0 | 100.0 | 100.0 | 100.0 | 100.0 |
| Caliper (in) | 0.601 | 0.581 | 0.558 | 0.552 | 0.563 |
| Density (pcf) | 10.6 | 10.9 | 11.8 | 12.1 | 12.4 |
| MOR (psi) | 81 | 71 | 69 | 77 | 88 |
| Corrected MOR (psi) 12.0 pcf density | 103 | 86 | 71 | 75 | 82 |
| Drain Time (Sec) | 7.5 | 3.25 | 4.0 | 5.0 | 5.35 |

In example 3, varying levels of gypsum were used to supplement the inorganic material provided by the paper sludge. The paper sludge fiber content also varied between 18 and 24 wt %. As shown above, increasing the sludge fiber content did not improve board strength and the strength remained about 15% below that of control panel 3. However, it is anticipated that increased starch levels could overcome this deficiency. Further, increased perlite levels could help panel strength (MOR). Again, test panels 6-9 provide superior drain times when compared to control panel 3.

Example 4

|  | Control Panel No. 4 | Test Panel No. 10 | Test Panel No. 11 | Test Panel No. 12 |
|---|---|---|---|---|
| Components (wt %) |  |  |  |  |
| Wool | 0 | 0 | 0 | 0 |
| Perlite | 52.0 | 52.0 | 54.0 | 56.0 |
| Starch | 6.0 | 6.0 | 6.0 | 6.0 |
| Fiber (hydropulp) | 20.0 | 0.0 | 0.0 | 0.0 |
| Fiber (sludge) | 0.0 | 20.0 | 20.0 | 20.0 |
| Total Fiber | 20.0 | 20.0 | 20.0 | 20.0 |
| Gypsum | 22.0 | 13.5 | 11.5 | 9.5 |
| Sludge Inorganic | 0.0 | 8.5 | 8.5 | 8.5 |
| Total Inorganic | 22.0 | 22.0 | 20.0 | 18.0 |
| Total Properties | 100.0 | 100.0 | 100.0 | 100.0 |
| Caliper (in) | 0.562 | 0.549 | 0.559 | 0.574 |
| Density (pcf) | 11.7 | 11.7 | 11.8 | 11.4 |
| MOR (psi) | 108 | 65 | 64 | 76 |
| Corrected MOR (psi) 12.0 (pcf) density | 114 | 68 | 66 | 84 |
| Drain Time (Sec) | 7.0 | 5.4 | 5.6 | 5.3 |

In example 4, the fiber content was maintained at 20 wt % while the perlite usage was increased from 52-56 wt % and the total inorganic content was reduced in test panels 11 and 12 to account for the increased perlite. The starch was maintained at 6.0 wt %.

Again, superior drain times are exhibited for the panels using fiber from paper sludge as opposed to hydropulp fiber. Board strength remained lower than the control board.

Increasing the perlite to 56.0 wt % did increase the board strength, although not dramatically. Additional starch may be used to increase the MOR.

Example 5

|  | Control Panel No. 5 | Test Panel No. 13 |
|---|---|---|
| Components (wt %) | | |
| Mineral Wool | 0 | 0 |
| Perlite | 54.0 | 62.0 |
| Starch | 6.0 | 9.0 |
| Fiber (hydropulp) | 20.0 | 10.0 |
| Fiber (sludge) | 0.0 | 10.0 |
| Total Fiber | 20.0 | 20.0 |
| Gypsum | 20.0 | 0.0 |
| Sludge Inorganic | 0.0 | 9.0 |
| Total Inorganic | 20.0 | 9.0 |
| Total Properties | 100.0 | 100.0 |
| Caliper (in) | 0.576 | 0.605 |
| Density (pcf) | 10.9 | 10.9 |
| MOR (psi) | 90 | 116 |
| Corrected MOR (psi) 12.0 pcf density | 109 | 141 |

In example 5, test panel 13 was made using the combination of conventional hydropulp fiber (10 wt %) and paper sludge fiber (10 wt %) without any added gypsum. Prior to use, the paper sludge cake was mixed with water to a 20% solids consistency using a mechanical stirrer and filtered to remove woodchips. After the woodchip removal, the ratio of fiber to inorganic material in the paper sludge slurry is 90:10. This high ratio was attributed to inorganic material loss during the woodchip removal process. Because of the loss of inorganic material, additional perlite was added to the formulation. Satisfactory MOR was achieved with test panel 13 thereby indicating that ceiling tile can be made using a combination of standard hydropulp fiber and landfill fiber with or without additional inorganic material. Higher board strength was also attributed to the increased starch content.

Example 6

|  | Control Panel No. 6 | Test Panel No. 14 | Test Panel No. 15 | Test Panel No. 16 | Test Panel No. 17 |
|---|---|---|---|---|---|
| Components (wt %) | | | | | |
| Wool | 0.0 | 0.0 | 0.0 | 0.0 | 0.0 |
| Perlite | 54.0 | 53.0 | 70.0 | 64.0 | 64.0 |
| Starch | 6.0 | 7.0 | 9.0 | 8.0 | 8.0 |
| Fiber (hydropulp) | 20.0 | 20.0 | 21.0 | 7.0 | 0.0 |
| Fiber (sludge) | 0.0 | 0.0 | 0.0 | 16.0 | 21.0 |
| Total Fiber | 20.0 | 0.0 | 21.0 | 23.0 | 21.0 |
| Gypsum | 20.0 | 0.0 | 0.0 | 0.0 | 0.0 |
| Fly Ash | 0.0 | 20.0 | 0.0 | 0.0 | 0.0 |
| Sludge Inorganic | 0.0 | 0.0 | 0.0 | 5.0 | 7.0 |
| Total Inorganic | 20.0 | 20.0 | 0.0 | 5.0 | 7.0 |
| Total Properties | 100.0 | 100.0 | 100.0 | 100.0 | 100.0 |
| Caliper (in) | 0.549 | 0.541 | 0.561 | 0.555 | 0.568 |
| Density (pcf) | 11.5 | 12.6 | 11.9 | 12.6 | 12.0 |
| MOR (psi) | 111 | 106 | 139 | 149 | 110 |
| Corrected MOR (psi) 12.0 pcf density. | 121 | 96 | 141 | 135 | 110 |
| NRC-without surface perforation. | 0.24 | 0.22 | 0.18 | 0.25 | 0.22 |

In example 6, the effects of fly ash, higher perlite amounts, combination of hydropulp and paper sludge fiber, and paper sludge fiber formulations without inorganic materials were evaluated. For test panel 15, increasing the starch content to 9 wt % for the high perlite formula increased board strength. For test panel 16, combination of paper sludge fiber (16 wt %) with hydropulp fiber (7 wt %) and starch (8 wt %) also provided excellent board strength. The high perlite formula of test panel 17 using only sludge fiber at 21 wt % and 8% starch also provided acceptable strength, noise reduction coefficient (NRC).

Example 7

|  | Control Panel No. 7 | Test Panel No. 18 | Test Panel No. 19 | Test Panel No. 20 | Test Panel No. 21 |
|---|---|---|---|---|---|
| Components (wt %) | | | | | |
| Wool | 8.0 | 0.0 | 0.0 | 0.0 | 0.0 |
| Perlite | 57.0 | 53.0 | 52.0 | 60.0 | 56.0 |
| Starch | 8.0 | 7.0 | 8.0 | 9.0 | 7.0 |
| Fiber (hydropulp) | 19.0 | 20.0 | 20.0 | 10.0 | 0.0 |
| Fiber (sludge) | 0.0 | 0.0 | 0.0 | 12.0 | 20.0 |
| Total Fiber | 19.0 | 20.0 | 20.0 | 22.0 | 20.0 |
| Gypsum | 0.0 | 20.0 | 0.0 | 0.0 | 0.0 |
| CaCo$_3$ | 8.0 | 0.0 | 0.0 | 0.0 | 0.0 |

-continued

|  | Control Panel No. 7 | Test Panel No. 18 | Test Panel No. 19 | Test Panel No. 20 | Test Panel No. 21 |
|---|---|---|---|---|---|
| Fly Ash | 0.0 | 0.0 | 20.0 | 0.0 | 0.0 |
| Sludge Inorganic | 0.0 | 0.0 | 0.0 | 9.0 | 17.0 |
| Total Inorganic | 8.0 | 20.0 | 20.0 | 9.0 | 17.0 |
| Total Properties | 100.0 | 100.0 | 100.0 | 100.0 | 100.0 |
| Caliper (in) | 0.569 | 0.558 | 0.569 | 0.574 | 0.572 |
| Density (pcf) | 12.1 | 11.5 | 11.9 | 12.1 | 12.0 |
| MOR (psi) | 121 | 133 | 99 | 148 | 125 |
| Corrected MOR (psi) 12.0 density | 119 | 145 | 101 | 146 | 125 |
| Drain Time (Sec) | 10.0 | 12.5 | 18.5 | 13.0 | 12.0 |
| Solids Retention | 94.0 | 87.5 | 92.7 | 94.0 | 94.0 |

In example 7, screened paper sludge was evaluated with no woodchips. The ratio of fiber to inorganic material was 55.2:44.8. The reduced drain time of control panel 7 was attributed to the lower amount of inorganic, calcium carbonate, present in the formulation. The drain times of test panels 20 and 21 using paper sludge in part (test panel 20) or in full (in test panel 21) provide acceptable board properties and drain time. In test panel 18, the drainage time was higher due to fly ash and lack of sludge inorganic.

Example 8

| Components (wt %) | Control Panel No. 8 | Test Panel No. 22 |
|---|---|---|
| Mineral Wool | 9 | 9 |
| Perlite | 54.0 | 54.0 |
| Starch | 8 | 8 |
| Hydropulp fiber | 20 | 0 |
| $CaCo_3$ | 9 | 0 |
| Sludge Fiber | 0 | 20 |
| Sludge inorganic | 0 | 9 |
| Total | 100 | 100 |
| Physical Properties Finished Boards (Perforated) | | |
| Caliper | 0.559 | 0.560 |
| Density (pcf) | 14.5 | 14.1 |
| Surface Hardness (Lbs) | 89.5 | 105.3 |
| MOR (psi) | 155.7 | 124.4 |
| Corrected MOR (psi) 14.5 density | 155.7 | 131.6 |
| Dust g/MSF | 132.2 | 113.4 |
| Estimated NRC | 0.576 | 0.629 |
| Physical Properties Unfinished Boards (Un-perforated and Un-painted) | | |
| Caliper | 0.600 | 0.633 |
| Density (pcf) | 11.8 | 12.9 |
| Surface Hardness (Lbs) | 90.5 | 93.8 |
| MOR (psi) | 174.8 | 159.5 |

The surfaces of the dried boards were sanded or ground to the desired thickness or caliper, back-sides were roll coated with sag resistant coating. Then the faces of the boards were textured, perforated and roll and/or spray coated again before curing. In example 8, control panel 8 includes all hydropulp fiber and test panel 22 includes all sludge fiber. The starch and inorganic contents were the same during the processing. Test panel 22 exhibits sufficient strength with a higher NRC which is very important for acoustic ceiling tiles and panels. All other properties are acceptable.

Thus, fiber provided with paper sludge from a virgin paper mill processes or a recycle paper mill processes can be substituted in whole or in part for standard hydropulp fibers. The sludge may be generated by either the pulp mill process or paper mill process. Preferably, woodchips present in pulp mill process sludge should be removed. Using paper sludge as a primary source of cellulosic fiber and inorganic materials provides acceptable board properties, improved drain times and lowers the raw material costs associated with manufacture of acoustic of ceiling tiles and panels.

While only certain embodiments have been set forth, alternatives and modifications will be apparent from the above description to those skilled in the art. These and other alternatives are considered equivalents and within the scope of this disclosure and the appended claims.

What is claimed:

1. An acoustic panel comprising:
   from 0 to about 75 wt % mineral wool;
   more than 0 to about 30 wt % inorganic materials selected from the group consisting of calcium sulfate, calcium carbonate, clay and mixtures thereof;
   more than 0 to about 15 wt % binder selected from the group consisting of starch, latex, a combination of starch and cellulosic fibers, kraft paper gel and mixtures thereof;
   from about 25 to about 70 wt % perlite;
   from about 10 to about 40 wt % cellulosic fiber;
   wherein about 25 wt % to about 100 wt % of the cellulosic fiber and about 20 wt % to about 80 wt % of the inorganic materials are provided by paper sludge obtained from pulp and paper processing waste, said paper sludge including cellulosic fiber and inorganic materials selected from the group consisting of clay, calcium carbonate and mixtures thereof.

2. The panel of claim 1 wherein the pulp and paper processing waste is generated by one of a virgin paper processing plant or a paper recycling plant.

3. The panel of claim 1 wherein the mineral wool is present in an amount less than or equal to 10 wt %.

4. The panel of claim 1 wherein gypsum is present in an amount less than or equal to 20 wt %.

5. The panel of claim 1 wherein the starch is present in an amount ranging from about 5 to about 15 wt %.

6. The panel of claim 1 wherein the perlite is expanded perlite and is present in an amount ranging from about 40 to about 65 wt %.

7. The panel of claim 6 wherein the expanded perlite has a density of less than 20 pounds per cubic foot (pcf).

8. An acoustic panel comprising:
   from 0 to about 75 wt % mineral wool;
   inorganic materials selected from the group consisting of gypsum, clay, calcium carbonate and mixtures thereof, wherein the acoustic panel comprises from more than 0 to about 30 wt % gypsum;
   from more than 0 to about 15 wt % binder selected from the group consisting of starch, a combination of starch and cellulosic fibers, latex, kraft paper gel and mixtures thereof;
   from about 25 to about 70 wt % perlite;

from more than 0 to 40 wt % paper sludge obtained from pulp and paper processing waste, said paper sludge including about 18 to about 24 wt % cellulosic fiber and also including inorganic material selected from the group consisting of clay, calcium carbonate and mixtures thereof, and wherein about 20 wt % to about 80 wt % of the inorganic materials in the acoustic panel are provided by the paper sludge.

9. The panel of claim 8 wherein the pulp and paper processing waste is generated by one of a virgin paper processing plant or a paper recycling plant.

10. The panel of claim 8 further comprising cellulosic fiber obtained from a hydropulped paper source.

11. The panel of claim 8 wherein the mineral wool is present in an amount less than or equal to 10 wt %.

12. The panel of claim 8 wherein the gypsum is present n an amount less than or equal to 20 wt %.

13. The panel of claim 8 wherein the starch is present in an amount ranging from about 5 to about 15 wt %.

14. The panel of claim 8 wherein the perlite is expanded perlite and is present in an amount ranging from about 40 to about 65 wt %.

15. A process for manufacturing acoustic panels in a water-felting process, the process comprising:
   forming an aqueous slurry comprising
      expanded perlite,
      inorganic material selected from the group consisting of calcium sulfate, calcium carbonate, clay and mixtures thereof,
      cellulosic fibers, and
      binder selected from the group consisting of starch, a combination of starch and cellulosic fibers, latex, kraft paper gel and mixtures thereof,
      wherein about 25 wt % to about 100 wt % of the cellulosic fiber and about 20 wt % to about 80 wt % of the inorganic material are provided by paper sludge derived from pulp and paper processing waste, said paper sludge including cellulosic fiber and inorganic material selected from the group consisting of clay, calcium carbonate and mixtures thereof;
   continuously flowing the slurry onto a moving foraminous support wire to form a cake;
   dewatering the cake to form a base mat such that the cake has a drain time of less than 20 seconds; and
   drying the base mat to produce acoustical tile.

16. The process of claim 15 wherein the pulp and paper processing waste is generated by one of a virgin paper processing plant or a paper recycling plant.

17. The process of claim 15 wherein at least a portion of the cellulosic fiber is obtained from a hydropulped paper source.

18. The process of claim 15 wherein the perlite is expanded perlite and is present in an amount ranging from about 40 to about 65 wt % on a dry basis.

19. The process of claim 15 wherein the resulting panels comprise:
   from more than 0 to about 75 wt % mineral wool;
   from more than 0 to about 30 wt % gypsum;
   from more than 0 to about 15 wt % binder selected from the group consisting of starch, a combination of starch and cellulosic fibers, latex, kraft paper gel and mixtures thereof;
   from about 25 to about 70 wt % perlite;
   from more than 0 to 40 wt % pulp and paper processing waste comprising cellulosic fiber and inorganic material selected from the group consisting of clay, calcium carbonate and mixtures thereof.

20. The process of claim 15 wherein the resulting panels comprise:
   from more than 0 to about 10 wt % mineral wool;
   from more than 0 to about 20 wt % gypsum;
   from about 5 to about 15 wt % binder selected from the group consisting of starch, a combination of starch and cellulosic fibers, latex, kraft paper gel and mixtures thereof;
   from about 40 to about 70 wt % perlite;
   up to 40 wt % pulp and paper processing waste comprising cellulosic fiber and inorganic material selected from the group consisting of clay, calcium carbonate and mixtures thereof.

* * * * *